Jan. 14, 1969 W. B. JENKINS 3,421,677
APPARATUS FOR JOINING METAL PRODUCTS
Filed Aug. 2, 1966 Sheet 1 of 2
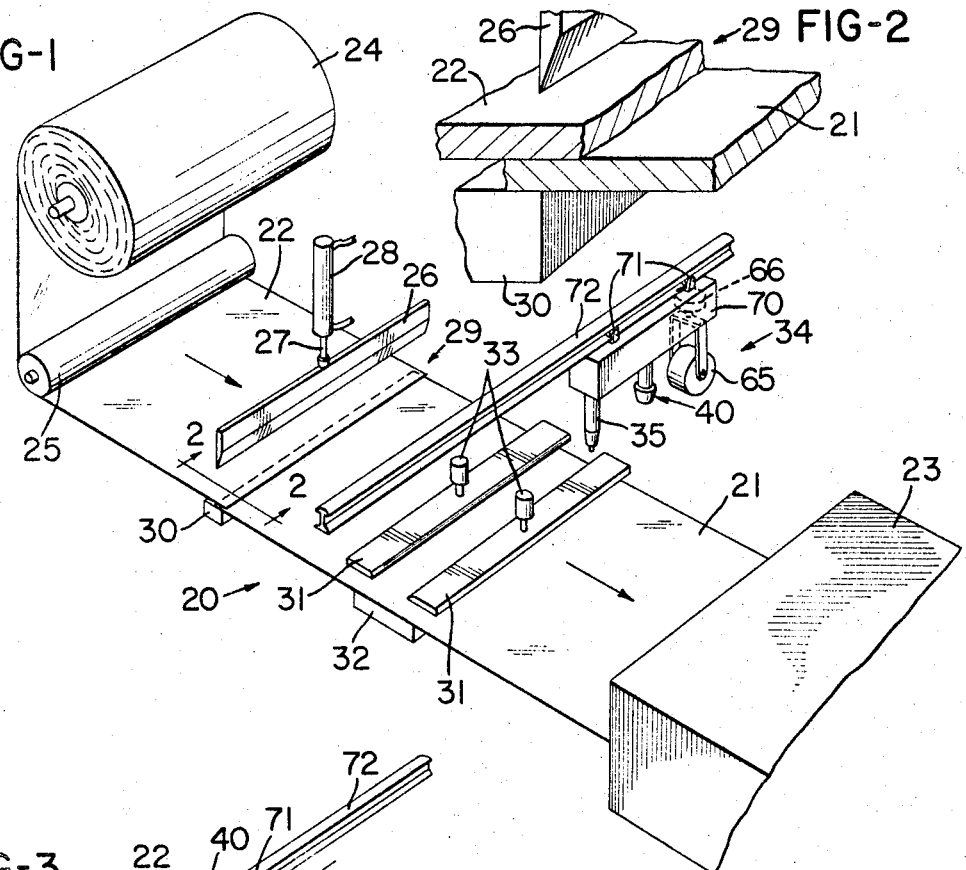
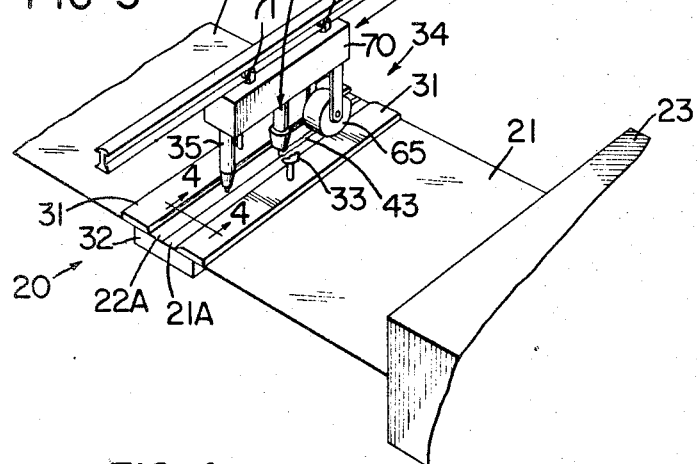
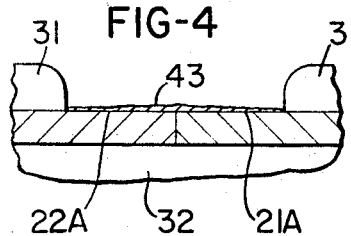
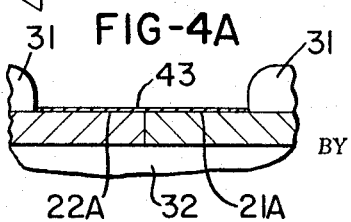
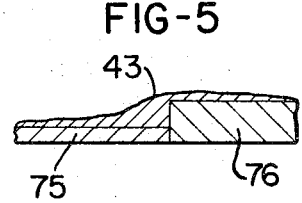
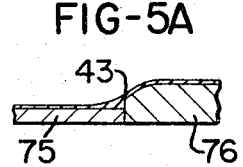
INVENTOR.
WILLIAM B. JENKINS
BY Glenn, Palmer,
Matthews & Lyne
HIS ATTORNEYS

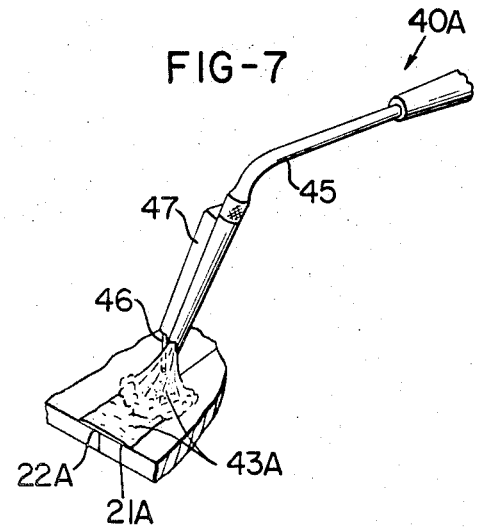
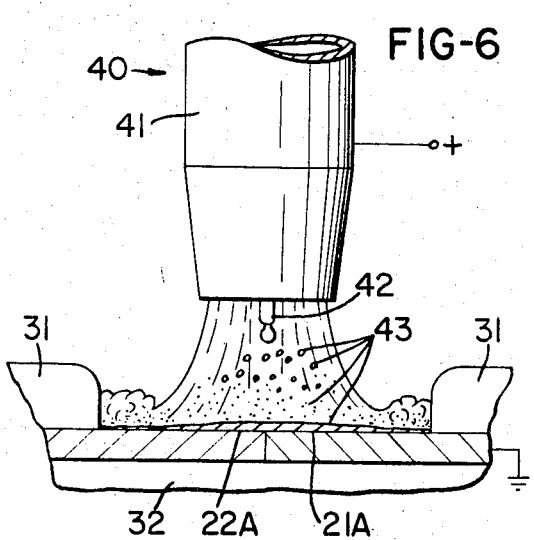
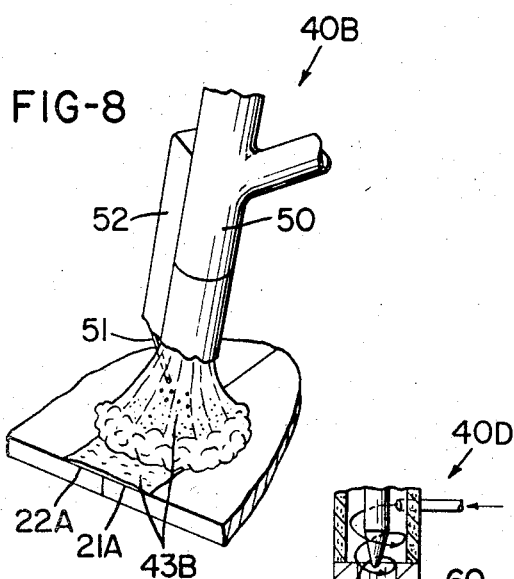
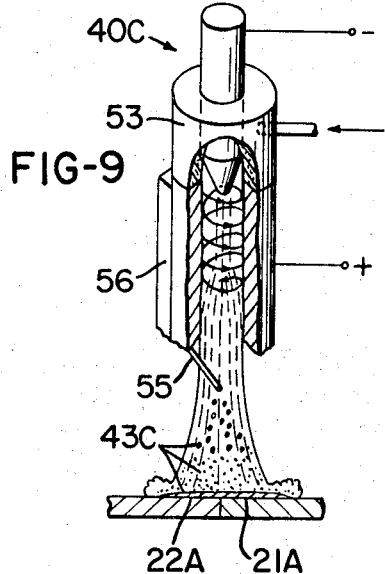
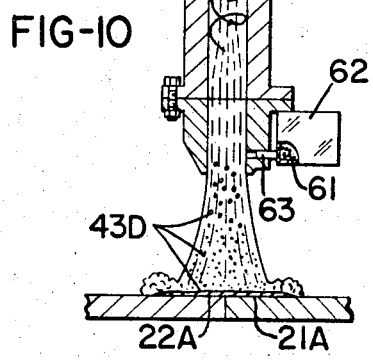

United States Patent Office 3,421,677
Patented Jan. 14, 1969

3,421,677
APPARATUS FOR JOINING METAL PRODUCTS
William B. Jenkins, Henrico County, Va., assignor to Reynolds Metals Company, Richmond, Va., a corporation of Delaware
Filed Aug. 2, 1966, Ser. No. 569,698
U.S. Cl. 228—19  9 Claims
Int. Cl. B23k 5/00; B23k 5/24

ABSTRACT OF THE DISCLOSURE

An apparatus for joining metal products, such as metal sheets, wherein a spray or layer of finely divided hot molten metal particles is deposited on a joint defined by a pair of such metal sheets, for example, which are held together in adjoining relation. The metal particles are then suitably compressed by a planishing roll to provide a high-strength joint.

---

This invention pertains to joints, which may also be referred to hereinafter in this specification as joint means, and more particularly to an improved apparatus for and method of joining metal product means.

Presently metal products means, such as a pair of metal sheets, for example, are joined together by placing such metal sheets in adjoining relation and welding along their adjoining portions using conventional welding techniques. In order to provide a satisfactory weld such conventional techniques require comparatively precise control of welding parameters such as providing exceptionally clean surfaces, assuring that the sheets to be welded are properly held together, and (especially in welding thin sheets) properly controlling the welding torch to prevent burning through the adjoining edge portions.

Accordingly, it is a feature of this invention to provide an improved apparatus for and method of joining metal product means, such as metal sheets, for example, in which welding parameters of the character mentioned above are not critical in the provision of a high strength joint.

Another feature of this invention is to provide an improved apparatus for joining metal product means simply and economically without requiring highly skilled operators.

Another feature of this invention is to provide an improved apparatus for joining metal product means by utilizing a spray of finely divided hot molten metal particles to provide a weld between such product means.

Another feature of this invention is to provide an improved apparatus for making a high strength joint between a plurality of metal sheet means, i.e., metal sheets by utilizing such spray of finely divided hot molten metal particles and compressing such metal particles to improve the structural qualities of such joint.

Another feature of this invention is to provide an improved apparatus for joining a plurality of metal sheet means by modifying and controlling known welding devices in cooperation with appropriate welding metal means, i.e., welding metal, to provide a controlled heat source which is used to provide a welding spray of finely divided hot molten metal particles.

Another feature of this invention is to provide an improved apparatus of the character mentioned which is particularly effective in economically joining a plurality of thin metal sheet means utilizing butt joint means.

Another feature of this invention is to provide a simple and economical method of joining metal product means which can be carried out by comparatively unskilled operators to provide a strong joint between such product means.

Another feature of this invention is to provide an improved method of joining metal product means by utilizing a spray of finely divided hot molten metal particles to make a high strength joint.

Another feature of this invention is to provide an improved method of making high strength butt joint means for joining a plurality of metal sheet means by utilizing a spray of finely divided hot molten metal particles and in which the structural quality of such butt joint means is improved by utilizing compressing means to compress such metal particles together after depositing them to form such joint means to thereby provide a more uniform bond between the joined metal sheet means.

Therefore, it is an object of this invention to provide an improved apparatus for and method of joining a plurality of metal product means having one or more of the novel features of this invention as set forth above or hereinafter shown or described.

Other objects, uses, and advantages of this invention are apparent from a reading of this description which proceeds with reference to the accompanying drawings forming a part thereof and wherein:

FIGURE 1 is a perspective view, with parts broken away, schematically illustrating the apparatus and method of this invention utilized with metal product means, shown as a pair of elongated metal sheets, which are to be cut, held together, joined—using a butt joint which may also be referred to in this specification as butt joint means, and then passed through an annealing oven.

FIGURE 2 is an enlarged fragmentary sectional view on the line 2—2 of FIGURE 1 particularly illustrating cutting means for cutting cooperating end portions of the metal sheet means of FIGURE 1 enabling them to be placed together in abutting relation to define such butt joint means.

FIGURE 3 is a fragmentary perspective view particularly illustrating the metal sheets of FIGURE 1 moved in position under a joining station while being held together by holding means.

FIGURE 4 is a sectional view on the line 4—4 of FIGURE 3 illustrating the metal sheet means of FIGURE 1 being held together at such joining station to define a square butt joint and particularly showing metal particles deposited thereon to bond the two sheets together.

FIGURE 4A is a view similar to FIGURE 4 after passing compressing means shown as a planishing roll (which may also be referred to in this specification as planishing roll means) thereover to provide an improved bond.

FIGURE 5 is a view similar to FIGURE 4 illustrating that metal sheets having different thicknesses can be satisfactorily joined using the apparatus and method of this invention.

FIGURE 5A is a view similar to FIGURE 4A showing the metal sheets of FIGURE 5 after passing such planishing roll thereover.

FIGURE 6 is a fragmentary perspective view particularly illustrating the central component of the apparatus of FIGURE 3 shown as a metal inert gas electric arc heat means used with associated welding metal means, i.e., welding metal, to provide a spray of finely divided hot molten metal particles to form the butt joint means illustrated in FIGURE 4.

FIGURE 7 is a fragmentary perspective view similar to FIGURE 6 illustrating an oxyacetylene heat means as such central component to provide such spray of metal particles.

FIGURE 8 is a fragmentary perspective view similar to FIGURE 6 illustrating a tungsten inert gas electric arc heat means used with welding metal means to provide such spray of metal particles.

FIGURE 9 is a fragmentary perspective view similar to FIGURE 6 illustrating a plasma-arc electric arc heat means as such central component utilized with welding metal means to provide such spray of metal particles.

FIGURE 10 is a fragmentary perspective view similar to FIGURE 9 in which such plasma-arc heat means has been modified to use a metal powder to provide such spray of metal particles.

While the various features of this invention are hereinafter illustrated and described as being particularly adaptable for joining together metal product means, such as a pair of metal sheets or webs, and to an improved method of joining such metal sheets, it is to be understood that the various features of this invention can be utilized singly or in any combination thereof to join other metal product means as desired.

Therefore, this invention is not to be limited to only the embodiments illustrated in the drawings because the drawings are merely utilized to illustrate one of the wide variety of uses of this invention.

In the exemplary embodiment of this invention illustrated in FIGURE 1 of the drawings, an improved apparatus designated generally by the numeral 20 is shown for joining together a plurality of metal product means such as a pair of metal webs or sheets 21 and 22. Sheets 21 and 22 are passed through an annealing oven 23 after being joined together using the apparatus and method of this invention.

Sheet 22 is provided in roll form as shown at 24 and suitably supported for rotation. In this example of the invention the beginning portion of sheet 22 is unrolled under an idler and guide roll 25 and placed over the tail end portion of sheet 21, which may have been previously provided in roll form and supported for unwinding rotation from an associated supply roll similar to the supply roll shown at 24, and the two sheets 21 and 22 are suitably cut to enable them to be placed together in adjoining relation to define a square butt joint.

Sheets 21 and 22 are cut simultaneously in this example of the invention by cutting means comprising a cutting knife 26 which is fastened to the terminal end portion of a telescoping rod 27 which is moved into and out of cutting engagement by an actuating cylinder 28. Sheet 22 is overlapped against sheet 21 as shown at 29 and cutting knife 26 is actuated into cutting position to provide a straight cut across the full width of sheets 21 and 22 in a simultaneous manner. A back-up plate 30 is suitably supported under the overlapped portions of sheets 21 and 22 and opposite knife 26 for cooperation with such knife to enable the end portions of sheets 21 and 22 to be properly cut.

Sheets 21 and 22 are suitably placed so that their cut edges are placed in abutting relation to define joint means shown as a square butt joint and so that respective end portions 21A and 22A thereof are placed adjoining each other. The improved apparatus and method of this invention enables sheets 21 and 22 to be joined at the joint means defined by adjoining end portions 21A and 22A in a simple and economical manner by holding such end portions together and depositing a spray of hot molten metal particles thereon and then preferably working such deposited metal particles to provide a stronger bond. The apparatus and method of this invention enables end portions 21A and 22A to be held together without great concern for the precision with which they are held.

Holding means is provided for holding end portions 21A and 22A in adjoining relation and in this example of the invention such holding means comprises a pair of holding plates each designated by the numeral 31 cooperating with a back-up plate 32 which also serves as a chill plate to carry away heat produced by the heat means of the apparatus of this invention as will be described subsequently. Each holding plate 31 is suitably actuated toward and away from plate 32 by suitable actuation means and in this example of the invention each plate is actuated by cylinder means shown as an air cylinder 33.

After cutting the associated end portions of sheets 21 and 22 as described above, such sheets are placed with end portions 21A and 22A in adjoining relation and in position at what will be referred to as a joining station and designated by the numeral 34. Any suitable means may be used to move and place end portions 21A and 22A in position at the joining station 34, including manual movement of both end portions 21A and 22A as well as movement wherein the same apparatus used to move sheet 21 through oven 23 may also be used to move end portion 21A in position. Holding plates 31 are each brought into holding engagement by energizing their associated actuators 33 thereby sandwiching adjoining end portions 21A and 22A between plates 31 and back-up plate 32 for cleaning and joining thereof as will be presently described.

Surface preparation means is provided for preparing the top surfaces of the adjoining end portions 21A and 22A of sheets 21 and 22 respectively and such surface preparation or cleaning means in this example comprises electric arc means 35 for cathodically cleaning such top surfaces. The electric arc heating means which provides the cleaning action is preferably tungsten inert gas electric arc heat means powered by alternating current or by reverse polarity direct current.

Reverse polarity direct current signifies that the electric arc torch is connected so that its electrode is positive. In alternating current reversal occurs every half cycle and polarity is not important. With alternating current there is, of course, some cleaning action every half cycle. The cathodic cleaning action, especially when using direct current reverse polarity, has been found very effective in cleaning surface oxides from aluminum sheet means.

The tungsten inert gas cleaning device 35 cleans the adjoining surfaces 21A and 22A so that upon spraying metal particles thereon a better bond is provided therefor. While cleaning device or torch 35 provides cathodic cleaning, it will be appreciated that other forms of cleaning may be employed, depending on the application.

Depositing means is provided for depositing a spray of finely divided hot molten metal particles on end portions 21A and 22A placed in adjoining relation as previously mentioned. The depositing means of this invention is designated generally by the numeral 40 and comprises heat means cooperating with welding metal means, such as a welding rod, or the like, which is to be melted by the heat means. The position of the heat means and the welding metal means above sheets 21 and 22 as well as the effective temperature of such heat means and the material comprising such welding metal means are all controlled so as to assure the provision of a spray of finely divided hot molten metal particles.

The heat means may comprise various types of heat means and in this example of the invention four preferred types of heat means are illustrated:

The depositing means 40 shown in FIGURES 1 and 3 of the drawings cooperating with the remainder of the apparatus of this invention is shown in more detail in FIGURE 6. Depositing means 40 comprises a metal inert gas welding torch 41 having welding metal means shown as a welding rod 42 provided as an integral part thereof.

Welding torch 41 has its voltage suitably electrically controlled for cooperation with integral metal rod 42 and such torch and rod are properly positioned and arranged above sheets 21 and 22 at joining station 34. The inert gas flow through torch 41 is also suitably controlled to provide a spray of finely divided hot molten metal particles designated by the numeral 43 both in their spray form and in their solidified deposited form.

The composition of the welding metal means or rod 42 associating with torch 41 is selected based on the materials being joined. Of course, the voltage used with torch 41, the type of inert gas and the flow thereof are all fairly closely controlled to provide the desired molten spray. Also the rate of feed of welding rod 43 is preferably automatically controlled.

FIGURES 7–10 of the drawings illustrate other embodiments of the depositing means all of which have been designated generally by the numeral 40 followed by different letter designations for the different embodiments. In addition the spray of molten metal particles and the solidified layer of metal formed thereby will also be similarly designated by the numeral 43 followed by letter designations corresponding to the letter designations of associated depositing means.

In the embodiment of depositing means 40A shown in FIGURE 7, oxyacetylene heat means shown as an oxyacetylene torch 45 is provided for welding end portions 21A and 22A. Torch 45 cooperates with a welding rod 46 which is preferably supported on torch 45 by a support and rod feed assembly 47. Assembly 47 preferably feeds rod 46 automatically as a function of the performance of torch 45 and of course both torch 45 and rod 46 are positioned and controlled to provide a welding spray of molten metal particles 43A in a manner as previously described.

In the embodiment of FIGURE 8, depositing means 40B includes heat means comprising tungsten inert gas electric arc heat means such as a tungsten inert gas torch 50. Torch 50 cooperates with welding meal means or a welding rod 51 which is preferably fed into position by a support and rod feed assembly 52 fastened to torch 50. Rod feed assembly 52 is preferably automatic in operation.

In a similar manner as described in connection with the embodiment of FIGURE 6, the voltage, inert gas flow, etc. of torch 50 are all suitably controlled to cooperate with properly selected rod 51 to provide spray 43B of hot molten metal particles against end portions 21A and 22A.

In the embodiment of FIGURE 9, depositing means 40C comprises heat means such as a plasma-arc electric arc torch 53 having a central core of extremely high temperature surrounded by a sheath of relatively cool inert gas. Plasma torch 53 cooperates with welding metal means such as welding rod 55 to provide a spray of metal particles 43C in a similar manner as previously described. Once again the amount of inert gas flow, position of plasma-torch 53 above adjoining end portions 21A and 22A and the relative position of rod 55 are all properly coordinated and controlled. Rod 55 in this example is supported on torch 53 by an assembly 56 which preferably provides an automatic feed therefor.

It has been shown that all known elements can be melted by the heat provided by the plasma-arc torch and such elements include tungsten, tantalum carbide and the like. Therefore, it will be appreciated that with this capability and with proper adjustment of inert gas flow through the plasma torch, proper positioning of such torch, and proper selection and cooperating control of welding material means to provide a metal spray 43, practically any type of metal sheet means or the like can be suitably joined to provide a high strength joint.

The embodiment of this invention illustrated in FIGURE 10 comprises depositing means 40D utilizing a plasma-arc torch 60 which cooperates with welding metal means such as a welding metal powder 61. Powder 61 is fed automatically, employing a feed device shown at 62 supported on torch 60. Powder 61 is fed through a conduit 63 which is positioned to introduce such powder at the proper position within torch 60 so as to provide a spray of hot molten metal particles 43D for welding end portions 21A and 22A.

In the embodiments of FIGURES 9 and 10 the plasma-arc torches are both illustrated operating in the non-transferred mode of operation—nozzle the anode. It will be appreciated that the plasma-arc torches may also be used operating in the transferred mode of operation—workpiece being the anode.

As seen in FIGURES 1 and 3 of the drawings and as previously mentioned sheets 21 and 22 employ back-up plate 32 at joining station 34 which serves as a cooling plate during cathodic cleaning by torch 37. Once hot metal particles 43 have been sprayed on end portions 21A and 22A, plate 32 provides support enabling the sprayed metal particles to be compressed against such end portions by suitable compressing means.

The compressing means illustrated in this example of the invention comprises a compressing or planishing roll 65. Planishing roll 65 compresses metal particles 43 against end portions 21A and 22A and across the butt joint formed by holding the terminal edges of sheets 21 and 22 against each other. Planishing roll 65 closely follows depositing means 40 and works the deposited spray 43. This working action with the deposited spray not yet cooled increases the density of the weld, provides a more uniform thickness, and provides a better bond area having greater strength.

Roll 65 is suitably supported for rotation and moves across the butt joint between sheets 21 and 22 so as to traverse the entire width of sheets 21 and 22. Roll 65 is yieldingly urged against sheets 21 and 22 by a pneumatic cylinder 66. Cylinder 66 is suitably controlled so that the compressing force exerted by roll 65 is closely correlated with the types of metal being joined and the particular requirements of the joint being produced.

As will be seen particularly in FIGURE 3 of the drawings the cleaning means or torch 35, depositing means 40, and planishing roll 65 are all supported on a common mechanical assembly designated by the numeral 70. Assembly 70 is supported above sheets 21 and 22 for movement thereacross by suitable conveyor means illustrated in this example of the invention as a plurality of roller bearing devices 71 fastened to assembly 70 and carried on a monorail track 72 to enable the entire assembly 70 to be moved across sheets 21 and 22 simultaneously. In this example of the invention sheets 21 and 22 are held with their respective end portions 21A and 22A at joining station 34. Assembly 70 is then moved thereacross in order to provide first the cleaning operation, followed by the metal depositing operation, which is then followed by the compressing or planishing operation.

The cleaning torch 35, depositing means 40, and planishing roll 65 are carried by assembly 70 in spaced apart relation and each are individually adjustable with respect to assembly 70 so as to provide their respective functions in the most efficient manner. Of course the rate of cleaning by torch 35, metal spraying by device 40, and application of compressing force are all correlated and correlated with the rate of moving assembly 70 across sheets 21 and 22 to thereby provide an optimum high strength joint.

Although planishing roll 65 is carried on assembly 70 in this example of the invention, it will be appreciated that such roll may be individually supported on a separate support therefor. Such individual support would allow more thorough working of the deposited material if desired.

Depositing means 40 deposits a metal layer 43 across end portions 21A and 22A having the general configuration shown in FIGURE 4 of the drawings and holding plates 31 also serve, in effect, to limit the width of the metal layer deposited. After planishing roll 65 is moved thereacross, the deposited metal 43 has a stronger and more uniform configuration as shown in FIGURE 4A and as previously described. The holding plates also tend to confine the deposited metal 43 during the rolling action.

While FIGURES 4 and 4A illustrate sheets of the same thickness which have been joined using the apparatus and method of this invention, such apparatus and method have been especially effective in joining sheets having different thicknesses.

FIGURES 5 and 5A of the drawings show a comparatively thin sheet 75 joined to a comparatively thick sheet 76. When welding sheets such as sheets 75 and 76 using normal welding techniques, the heat balance between such relatively thin and comparatively thick sheets is such that a satisfactory bond or weld therebetween is quite difficult (and in some cases impossible) to obtain. However, using the apparatus and method of this invention it has been found that heat balance does not play nearly as significant a part in the provision of a proper weld or joint. Strong butt joints have been successfully provided using the apparatus and method of this invention in which the thickness ratios of the sheets joined was of the order of 3 to 1.

The apparatus and method of this invention may be used to weld or join all types of weldable metal product means irrespective of whether the products to be joined are made of the same material or not. Such apparatus and method have been especially successful in providing a strong joint between aluminum sheets having thicknesses ranging from .005 inch to .125 inch as well as in many combinations of thick to thin sections having ratios of approximately 3 to 1 or greater.

Thus, it is seen that the apparatus and method of this invention do not require precise control of welding parameters and that a practically foolproof joint is provided without wasting welding material and producing scrap parts. Normally a lot of scrap parts are produced particularly on very thin gauge sheet means due to the harshness of the arc. This invention makes possible welding even the very thinnest of sheet means or sheets without damage.

The positioning and control of the various types of heat means whether oxyacetylene torch, metal inert gas torch, tungsten inert gas torch, or plasma-arc torch, each cooperating with their associated welding material means at a controlled position above metal sheets 21 and 22 to be joined results in providing a spray 43 which spray is practically harmless when striking against surface means to be joined. However, even though spray 43 is practically harmless an improved high strength bond is provided economically and efficiently and without use of complicated equipment.

The compressing means or planishing roll 65 illustrated in the drawings produces a flat surface as shown. It will be appreciated that a planishing roll having a preferably contoured surface is used when planishing sheet means of different thicknesses.

In this disclosure of the invention an annealing oven has been shown and described, by way of example, to show further processing of joined sheet means. It will be appreciated, of course, that the improved apparatus and method of this invention may be used to join metal sheet means where further processing thereof is not desired. Obviously, further processing of sheet means joined by such improved apparatus and method may be achieved by any suitable equipment as determined by the end use of such sheet means and may include equipment such as heat treating ovens, painting equipment, surface treating equipment, etc. Therefore, the schematic showing of an annealing oven presented in FIGURE 1 of the drawings is for purposes of illustration only and could be replaced with the above items of equipment or other equipment, as desired.

Thus, it is seen that an improved apparatus for joining a plurality of metal product means, such as metal sheet means has been provided which is of simple and economical construction, requires a minimum time to accomplish the welding action and which is practically foolproof in operation.

Further, an improved method has been provided for joining a plurality of metal product means employing unique depositing means of this invention.

While the form of the invention now preferred has been disclosed as required by statute, other forms may be used, all coming within the scope of the claimed subject matter which follows.

What is claimed is:

1. An apparatus for joining a pair of metal sheets comprising, holding means for holding end portions of said sheets in adjoining relation to define a joint, said holding means comprising a lower back-up plate and a pair of spaced holding plates supported for movement toward and away from said backup plate and said holding plates sandwiching said end portions against said back-up plate and defining a given width therebetween which is substantially greater than the thickness of either sheet, depositing means for depositing a substantially uniform layer of finely divided hot molten metal particles on said joint and across said entire width to provide a high-strength joint between said metal sheets, compressing means for compressing said metal particles against said end portions to increase the bond therebetween and provide said layer with a more uniform thickness and thereby increase the strength of said high-strength joint and a mechanical assembly supported above said sheets for reciprocating movement thereacross, said assembly having said depositing means and compressing means mounted thereon in spaced relation with said depositing means being mounted so that it moves across said joint ahead of said compressing means, and said assembly being adapted to be moved in a predetermined path across said joint to simultaneously move said depositing means and compressing means to define said high-strength joint in a rapid manner.

2. An apparatus as set forth in claim 1 in which said depositing means comprises heat means cooperating with an associated welding metal, said heat means and welding metal being supported and controlled to provide said substantially uniform layer of finely divided hot molten metal particles.

3. An apparatus as set forth in claim 2 in which said heat means comprises oxyacetylene heat means.

4. An apparatus as set forth in claim 2 in which said heat means comprises metal inert gas electric arc heat means having said welding metal provided as a part thereof.

5. An apparatus as set forth in claim 2 in which said heat means comprises tungsten inert gas electric arc heat means.

6. An apparatus as set forth in claim 2 in which said heat means comprises plasma-arc electric arc heat means.

7. An apparatus as set forth in claim 1 and further comprising electric arc cleaning means for cathodically cleaning the top surfaces of said end portions, said electric arc cleaning means being mounted on said assembly ahead of and spaced from said depositing means and further comprising moving means for moving said assembly and hence said electric arc cleaning means, depositing means, and compressing means in the sequence stated across said end portions of said metal sheets.

8. An apparatus as set forth in claim 7 in which said compressing means comprises a planishing roll adapted to be rolled across said joint to compress said layer of metal particles and end portions of said metal sheets against said lower plate.

9. An apparatus as set forth in claim 1 in which said back-up plate is in the form of a chill plate to enable more rapid cooling of the deposited layer of molten metal particles.

References Cited

UNITED STATES PATENTS

| | | | |
|---|---|---|---|
| 1,866,044 | 7/1932 | Krebs. | |
| 2,922,869 | 1/1960 | Giannini. | |
| 3,149,222 | 9/1964 | Giannini. | |
| 3,190,525 | 6/1965 | Foley | 228—5 |
| 3,191,843 | 6/1965 | Tomkins | 228—5 |
| 3,278,720 | 10/1966 | Dixon | 219—121X |
| 3,307,764 | 3/1967 | Robinson | 228—5 |
| 3,328,556 | 6/1967 | Nelson | 219—125X |

JOHN F. CAMPBELL, *Primary Examiner.*

R. F. DROPKIN, *Assistant Examiner.*

U.S. Cl. X.R.

29—488, 493, 497.5, 498, 499; 219—125; 228—32, 44